Patented Jan. 7, 1930

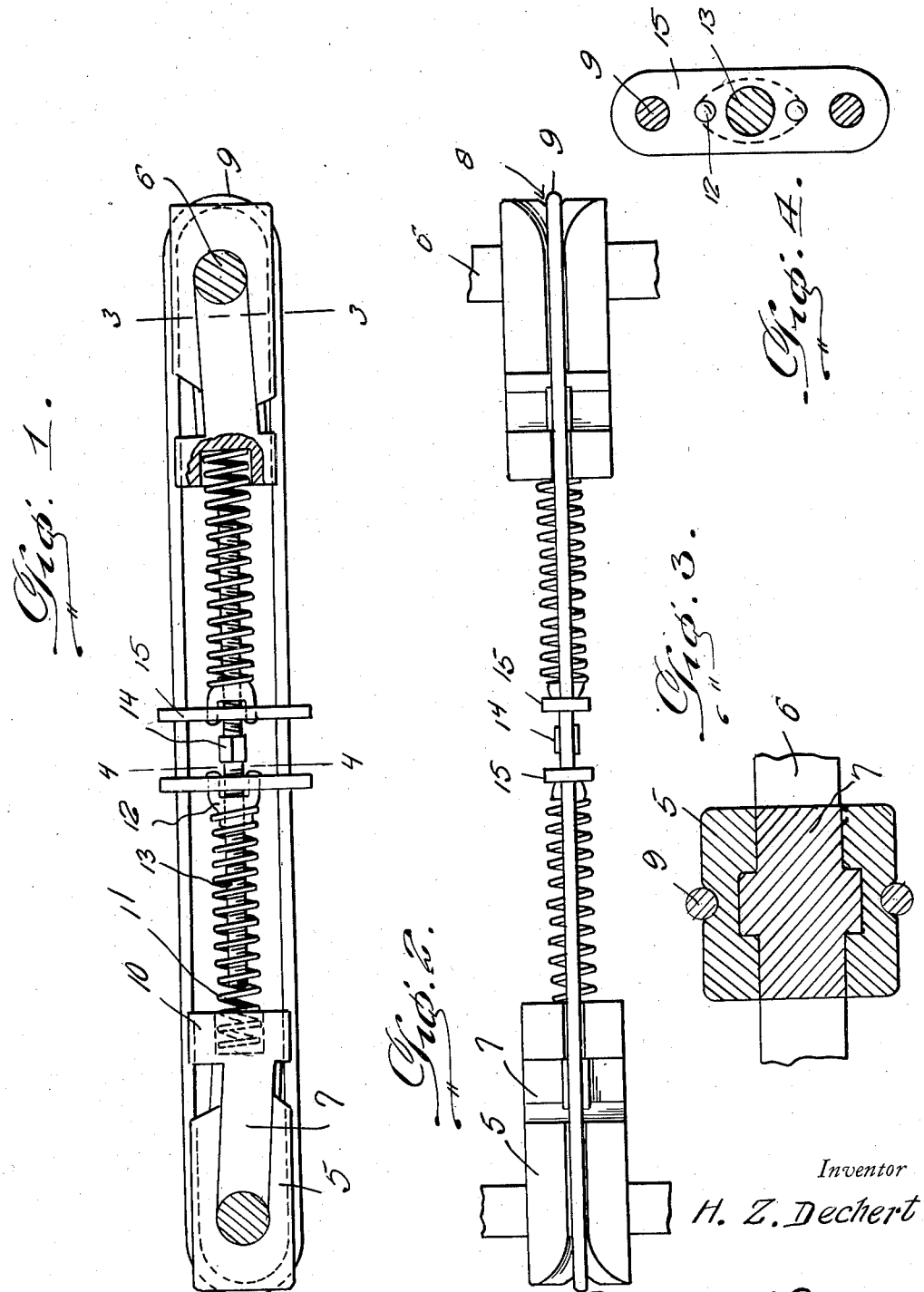

1,742,238

UNITED STATES PATENT OFFICE

HENRY Z. DECHERT, OF REXFORD, KANSAS

YIELDABLE ROD COUPLER

Application filed July 8, 1927. Serial No. 204,261.

My invention relates to rod couplers and provides means for yieldably connecting the rod whereby to permit limited movement therebetween so as to relieve the coupler of the usual strain which is present in a rigidly formed coupling and thus prevent the breaking of the coupling due to a too sudden movement of either of the rods connected thereby.

A further object is to provide a rod coupler forming a yieldable connection between the rods and embodying means for adjusting the tension of such yieldable connecting means.

Other objects and advantages reside in the special construction, combination and arrangement of the various elements forming the invention as more fully hereinafter described and claimed, reference being had to the accompanying drawings forming part hereof, wherein:

Figure 1 is a side elevational view of the device,

Figure 2 is a plan view thereof,

Figure 3 is a transverse sectional view taken along a line 3—3 of Figure 1,

Figure 4 is a similar view taken along a line 4—4 of Figure 1.

Referring now to the drawing I have disclosed a preferred embodiment of my invention including a pair of coupler heads indicated at 5 having openings transversely arranged therethrough within which may be rotatably carried rods 6 arranged parallel with respect to each other. A transversely arranged slot is formed in each of the heads communicating with the opening carrying the rod and extending laterally from the head at one side thereof. A shank 7 is slidably arranged in each of said slots having its inner end formed with an arcuate recess for engaging one side of the rod, said rod being adapted to slide longitudinally in said slot and normally retained at its innermost section by engagement of the shank therewith.

Extending around the base of each of the blocks is formed a groove 8 adapted to seat a substantially oblong shaped guide member 9, said member being continuously formed and retaining the blocks against spreading movement. The inwardly extending ends of the shank 7 are provided with heads 10 having their opposite faces provided with grooves whereby to slidably retain the same between the opposite sides of the guide member 9, each of said heads having a recess formed therein adapted to receive one end of a coil spring 11. The springs 11 are arranged in spaced parallel relation with respect to the side portions of the member 9 with their ends opposite from the ends 10 abutting wing nuts 12 threadedly carried on a screw 13 disposed within the convolutions of the spring. The screw 13 is of a double ended formation, each of said ends being arranged within one of the springs 11 engaging the shank 7 arranged at opposite ends of the coupler and intermediate the ends of the screw is provided an integrally formed nut 14. The wingnuts 12 may be threaded along the screw 13 whereby to yieldably adjust its associated spring.

The winged ends of the nut 12 are adapted to be inserted in openings formed in a plate 15 slidably carried upon the sides of the guide 9 and thus serving to prevent the rotation of the wing nut 12 during the engagement thereof by said plate. It is apparent however, that the plate may be disengaged from the wingnut to permit the proper movement thereof for the adjustment of the spring 11.

As clearly illustrated in Figures 1 and 2 of the drawing, when considered together with the foregoing explanation, it will be apparent that a positive connection is formed between the rods 6 and at the same time permitting of a limited movement thereof toward each other thus providing a yieldable connection between the rods so as to prevent the breaking of the coupling should the rods be suddenly moved in a direction toward each other.

It is obvious that the invention is susceptible to various changes and modifications without departing from the spirit thereof or the scope of the appended claims and I accordingly claim all such forms of the device to which I am entitled.

I claim:

1. In a rod coupler, a pair of coupler heads mounted respectively on a pair of spaced parallel rods, a continuously formed guide member, including a pair of spaced parallel rod members disposed at opposite sides of said head, said parallel members being connected at each end or extending about the outer ends of the respective heads for retaining the heads against outward movement, each of said heads having a slot formed therein extending laterally with respect to the rod, a shank slidably arranged in said slot having the inner ends engageable with the rod, a rigid member arranged between said shanks in spaced relation therefrom, means carried by said rigid member yieldably spacing the opposite ends thereof from the adjacent shanks, and means carried by said rigid member for tensionally adjusting said yieldable means.

2. In a rod coupler, a pair of coupler heads mounted respectively on a pair of spaced parallel rods, each head having a slot formed therein extending laterally with respect to the rod and arranged for relative lateral movement of the rods therein, a continuously formed guide member retaining the same against spreading movement, shanks slidably arranged in said slots having their inner ends engaging said rods, a double ended screw having its opposite ends extending in a direction toward said shanks and arranged in spaced relation therefrom coil springs arranged on each end of said screw with one end engaging the adjacent end of the shank whereby to normally urge the same in engaged position with its associated rod, nuts threadedly arranged inwardly of the ends of the screw and adapted to tensionally adjust said springs and locking plates for the respective nut slidably arranged on said guide and adapted to engage the nut whereby to secure the same in adjusted position.

In testimony whereof I affix my signature.

HENRY Z. DECHERT.